United States Patent [19]

Steiger

[11] 4,070,996
[45] Jan. 31, 1978

[54] RECIPROCATING INTERNAL COMBUSTION ENGINE FOR THE COMBUSTION OF FINELY DIVIDED SOLID FUEL

[75] Inventor: Anton Steiger, Illnau, Switzerland

[73] Assignee: Sulzer Brothers Limited, Winterthur, Switzerland

[21] Appl. No.: 715,532

[22] Filed: Aug. 18, 1976

[30] Foreign Application Priority Data

Apr. 7, 1976 Switzerland ............... 4354/76

[51] Int. Cl.² ............................................. F02D 19/04
[52] U.S. Cl. ...................... 123/23; 60/39.46 S
[58] Field of Search ............ 123/23, 24, 136, 1 R; 60/39.46 S, 39.12

[56] References Cited

U.S. PATENT DOCUMENTS 1,719,023  7/1929  Pawlikowski ............... 123/23
1,897,478  2/1933  Holzwarth ............... 60/39.46 S
2,396,524  3/1946  Nettel ............... 123/23

FOREIGN PATENT DOCUMENTS

507,533  6/1939  United Kingdom ............... 123/23

Primary Examiner—Charles J. Myhre
Assistant Examiner—Craig R. Feinberg
Attorney, Agent, or Firm—Kenyon & Kenyon, Reilly, Carr & Chapin

[57] ABSTRACT

A powdered coal air suspension is charged from a rotating drum via a switch means into a vertical channel which is sealed off from a powdered coal collector in the valve piston by an axially hollow slider. Downward movement of the slider allows the powdered coal to charge into the valve piston while an air valve within the vertical channel opens when the valve piston opens to create an air blast for expelling the coal and air into the combustion chamber.

24 Claims, 9 Drawing Figures

RECIPROCATING INTERNAL COMBUSTION ENGINE FOR THE COMBUSTION OF FINELY DIVIDED SOLID FUEL

This invention relates to a reciprocating internal combustion engine for the combustion of finely divided solid fuel.

Heretofore, various types of reciprocating internal combustion engines have been known to be powered by solid fuels of finely divided form. One such engine is described in the published magazine "Power" of Nov. 6, 1928, pages 746 and 747. In this described engine, a suspension of powdered coal and air is transported by means of a conveyor screw to a point where two valves are located, each nested coaxially in the other. These valves allow the powdered coal to move into an antechamber in the rhythm of the engine. In addition, a certain amount of ignition oil is supplied in the antechamber, whereupon air is blown into the antechamber by means of a valve mounted in a cylinder head laterally of the first-mentioned valves. This blowing air then transports the powdered coal and the ignition oil from the antechamber into the combustion chamber of the cylinder. However, in the course of travel to the antechamber, the suspension is deflected repeatedly. As a result, the homogeneity of the suspension is distributed and the cylinder is filled in different degrees for each working cycle. Hence, different power output per cycle occurs. Furthermore, the construction of the engine is rather complicated because of the two coaxially disposed valves and the antechamber.

Accordingly, it is an object of the invention to improve an engine of the type described above so that the power delivered per working cycle becomes more uniform and at the same time the construction is made considerably simpler.

Briefly, the invention is directed to a reciprocating internal combustion engine having a combustion chamber for the combustion of a finely divided solid fuel, such as powdered coal. In accordance with the invention, the engine is provided with a means for forming a suspension of solid fuel particles and air, a valve piston for cyclically expelling the solid fuel particles into the combustion chamber from a powdered coal collector adjacent the combustion chamber, a channel which extends between the suspension-forming means and the collector along a straight vertical longitudinal axis, and an air valve disposed in the channel above the collector. The channel serves to deliver the fuel/air suspension to the collector while the air valve functions to cyclically charge air into the collector to expel the fuel particles in the collector into the combustion chamber via the valve piston. This engine construction has practically no deflections in the path of the suspension so that the suspension will retain the original powdered coal distribution from the point of formation to the collector. This ensures that the amount of powdered coal available for each working cycle is stored in the collector so as to be uniformly distributed over the circumference of the valve piston. Thus, uniform distribution can also be obtained when the powdered coal is introduced into the combustion chamber of the working cylinder. Because the collector is located on the valve piston which shuts the discharge end of the straight channel off from the combustion chamber, a chamber corresponding to the antechamber of the known engine is obviated. This makes the construction of the engine substantially simpler. The fact that the valve controlling the blast air flow is located near the collector contributes to this simplification.

These and other objects and advantages of the invention will become more apparent from the following detailed description and appended claims taken in conjunction with the accompanying drawings in which:

Figure 1A:
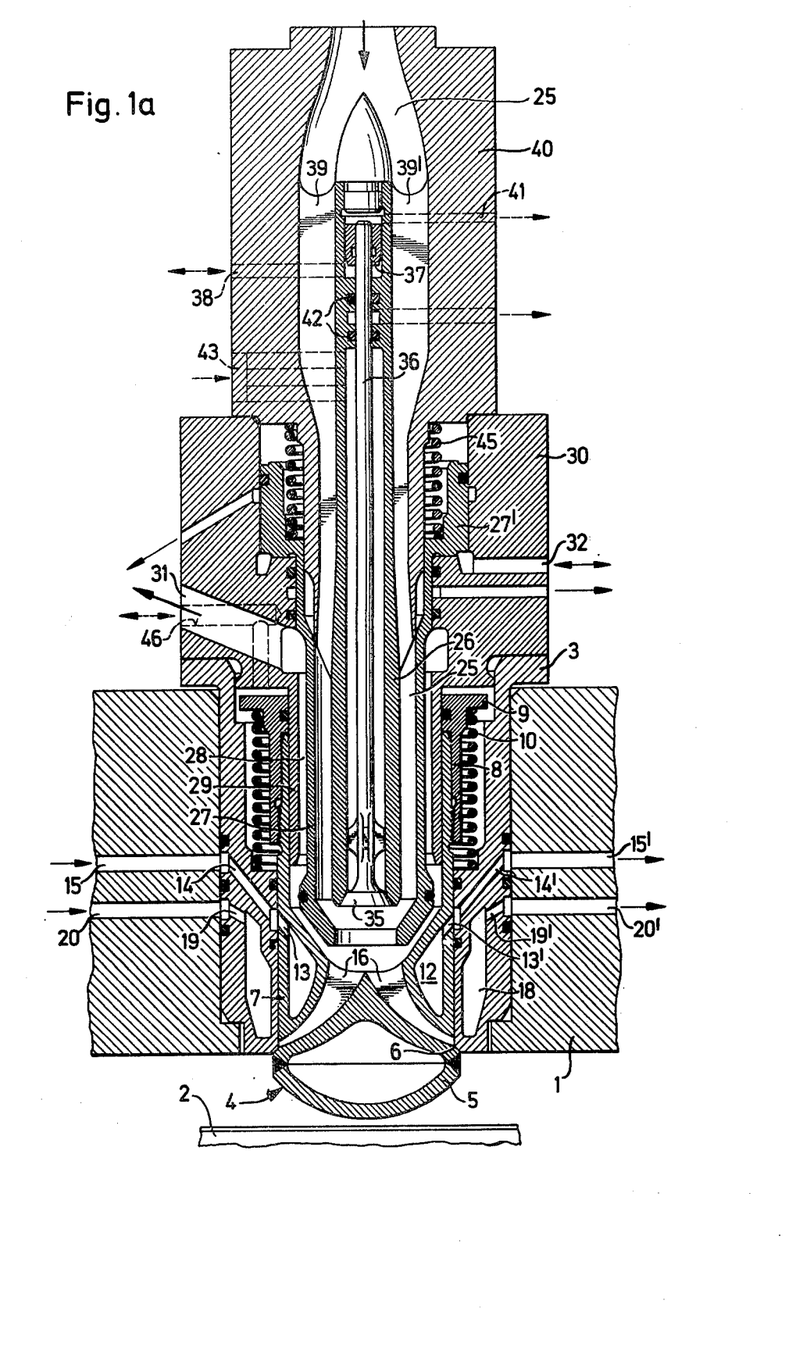
FIG. 1a illustrates an axial sectional view of a cylinder head of an internal-combustion engine according to the invention.

Referring to FIG. 1a, the reciprocating internal combustion engine has a cylinder head 1 which contains at least one cylinder to form a combustion chamber in which a working piston 2 is movably mounted in known manner. A tubular insert 3 is mounted in the cylinder head 1 coaxially of the axis of the cylinder 2 and guides a valve piston 4 within the cylinder head 1.

The valve piston 4 has a valve body 5 which is guided in the lower end of the insert 3 to sealingly seat via a seating surface 6 against the insert 3 when in a closed position relative to the combustion chamber. The valve piston 4 also has a hollow shaft 7 extending above the seating surface 6 which is enclosed and threaded in a depending sleeve part 8 of a piston 9. The underside of the piston 9 is braced against a compression spring 10, the lower end of which is accommodated by a cylindrical recess in the insert 3. The compression spring 10 thus keeps the valve body 5 in the closed position.

The lower area of the shaft 7 is provided with an annular cavity 12 through which a coolant flows to cool the valve body 5. For this purpose, the cavity 12 is connected through openings 13 and 13' with several passages 14 and 14', respectively, in the insert 3 and connects with a coolant supply line 15 and with a coolant discharge line 15' in the cylinder head 1. The insert 3 is also provided with a cooling cavity 18 which communicates through radial openings 19 and 19' with a coolant supply line 20 and a coolant drainage line 20' in the cylinder head 1.

The valve piston 4 also has a powdered coal collector adjacent the combustion chamber which is divided by radial ribs into a plurality of chambers 16 which are open towards the top and end near the seating surface 6. These chambers 16 serve to collect powdered coal before the coal enters the combustion chamber of the cylinder.

An annular channel 25 is located above the valve piston 4 and is formed between a central tube 26 and a hollow slider 27 which is disposed coaxial thereto and is movable axially. In the lower position shown in FIG. 1a, both the annular channel 25 and another annular channel 28 formed between the slider 27 and a surrounding cylindrical wall 29 of an insert 30 secured together with the insert 3 to the cylinder head are open. The outside surface of the cylindrical wall 29 guides the upper area of the shaft 7 of the valve piston 4 and is sealed against the inner boundary of the piston 9. At the upper end, the annular channel 28 terminates in a duct 31 in the insert 30 through which suspension air escapes, after having been freed of the powdered coal particles and deflected around the lower end of the hollow slider 27.

The hollow slider 27 is thicker at the lower end and is provided with a seal which, in the upper position of the slider 27, cooperates with the inside surface of the cylindrical wall 29. In this upper position, the lower end of the hollow slider 27 also seats against the lower end of the central tube 26 so that both the annular channel 25 and the annular channel 28 are then closed. In order to shift the hollow slider 27, the upper end, as viewed in FIG. 1a, is provided with a piston 27′ which is guided in a cylinder bore of the insert 30. A bore 32 is formed in the insert 30 to communicate the underside of the piston 27′ with a pressure medium line (not shown). The pressure medium, acting upon the underside of piston 27′, moves the piston, to counteract a compression spring 45 disposed on the other side of the piston 27′.

A bore 46 in the insert 30 also communicates a pressure medium line (not shown) with the insert 3 above the piston 9 to open the valve piston 4.

The central tube 26 is centrally mounted in a connecting piece 40 via a plurality of circumferentially spaced ribs 39 and 39′. In addition, the central tube 26 is provided on the lower end with a coaxially disposed valve 35 which controls the admission of blasting air which serves to inject the powdered coal stored in the chambers 16 when the valve piston 4 is moved into the open position. This air valve 35 is connected via a central rod 36 to a servo piston 37 which is axially movable in a cylinder formed in the tube 26. A pressure medium line 38 extends from below the servo piston 37 radially through the cylinder, a rib 39 and the connecting piece 40. The connecting piece 40 joints the insert 30 to a suspension-forming means shown in FIGS. 1b, 2 and 3. A line 41 is provided above the servo piston 37 for the drainage of leaking pressure medium. The control rod 36 of the valve 35 is enclosed by a sealing arrangement 42 which is likewise connected to a line for the drainage of leaking pressure medium. The pressure medium supplied through the line 38 acts upon the servo piston 37 to keep the air valve 35 closed, whereas opening of this valve 35 is accomplished by the blast air itself when the pressure of the pressure medium uner the servo piston 37 is lowered. The blasting air is fed in below the sealing arrangement 42 through a line 43 disposed radially in the connecting piece 40, the rib 39 and the tube 26.

Figures 1B, 2:
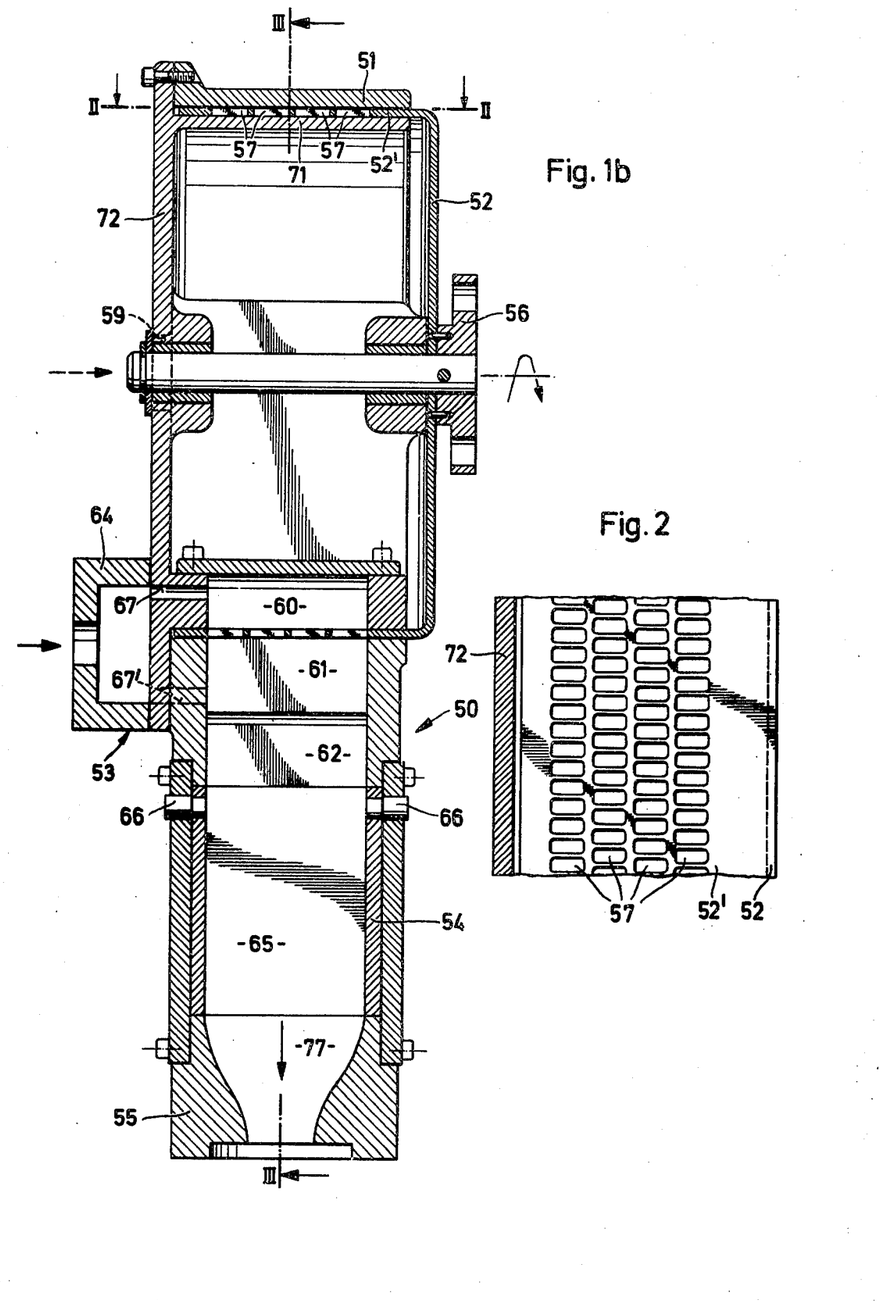
FIG. 1b illustrates a sectional view of a means for the formation of a fuel-and-air suspension in accordance with the invention.
FIG. 2 illustrates a view taken on line II-II showing the detail of the means shown in FIG. 1b.

Referring to FIG. 1b, a suspension-forming means 50 adjoins the connecting piece 40 and consists of a cylindrical housing 51 in which a drum 52 is rotatably mounted, an air supply means 53, a switch means 54 and a connecting flange 55 for mounting on the connecting piece 40.

The drum 52 is perforated and is connected to a drive flange 56, to which an electric motor (not shown) is coupled. A cylindrical portion 52′ of the drum 52 is provided over the entire periphery with an even number, e.g. four, of rows of rectangular holes or slots 57 (FIG. 2) whose size in the circumferential direction is smaller than in the axial direction. The slots 57 in the four rows are arranged so as to be mutually staggered in the first and second as well as in the third and fourth row, while the slots in the first and third as well as in the second and fourth row are in line with each other. More than 100 slots are provided per row.

Figure 3:
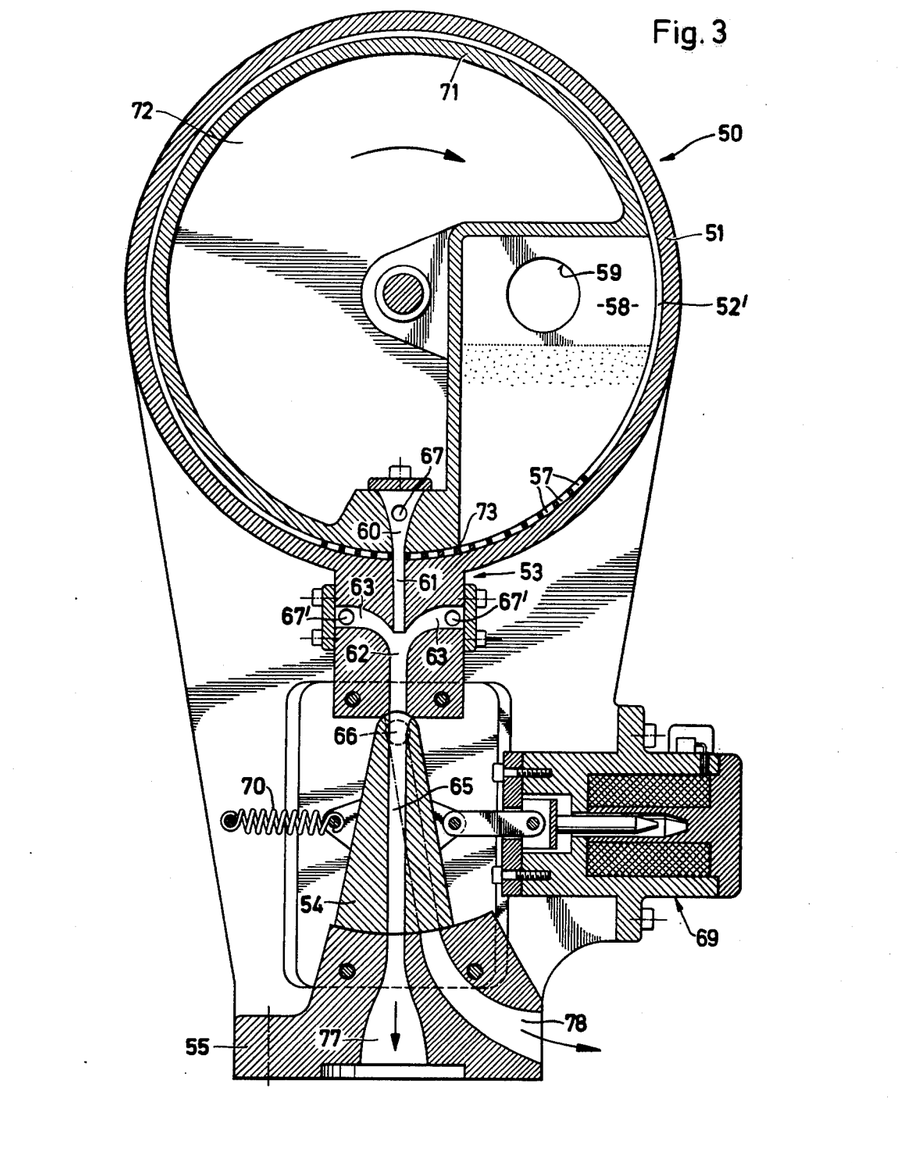
FIG. 3 illustrates a view taken on line III—III in FIG. 1b.

As shown in FIG. 1b, an insert 71 is provided in the housing 51 which extends axially inward from a housing cover 72 and forms an inner wall. As shown in FIG. 3, a reservoir or chamber 58 is formed in the insert 71 to which powdered coal is supplied through an opening 59 in the cover 72, the powdered coal accumulating below the opening 59 approximately to the level indicated by the dots. The air supply means 53 has a slot-like downwardly directed air discharge channel 60, 61, 62 (FIG. 3) in the lower area of the housing 5 to the left of the powdered coal collecting chamber 58 as viewed. This air discharge channel has an upper portion 60 within the drum 52 which tapers down in the radial direction like a nozzle and has a mouth width as measured in the circumferential direction of the housing 51 which equals the size of the slots 57 as measured in the circumferential direction. The lower portion 61 of the channel is aligned below the upper portion 60 and is located below the cylindrical portion 52′. This channel portion 61 has a cross-sectional area in the radial direction which is constant and empties into a channel portion 62 of slightly larger cross-sectional area. A pair of ejector-like channels 63 are disposed symmetrically of the channel portion 62 at the junction point.

As shown in FIG. 1b, air is fed to the channel portions 60 and 63 from a common, box-shaped distributor 64 through holes 67 and 67′, respectively.

Referring to FIG. 3, the switch means 54 adjoins the channel portion 62 and is located between the air discharge channel 60, 61, 62 and the vertical channel 25 in order to connect these channels together. To this end, the switch means 54 contains a passageway 65 of a cross-sectional area equal to that of the channel portion 62 and is pivotally mounted about two pins 66 disposed at the upper end to move between a filling position shown in FIG. 3 in which the passageway 65 is aligned with a channel 77 in the connecting flange 55 and a position in which the passageway 65 is in line with a channel 78 through which the suspension can be returned to a powdered coal reservoir (not shown). The distance between the inlet of the channel 77 and the inlet of the channel 78 is such that the total cross-sectional flow area between the passageway 65 and the two channels 77, 78 remains constant in the intermediate positions of the switch means 54. An electromagnet 69 is provided to actuate the switch means 54 and, in an energized state, positions the switch means 54 so that the passageway 65 communicates with channel 78, while in the unenergized state, an extension spring 70 pulls the switch means 54 into the filling position.

The inside diameter as well as the outside diameter of the cylindrical portion 52′ of the perforated drum 52 are guided tightly in the housing 51 and the insert 71, respectively. In the area of the powdered-coal collecting chamber 58, the wall 71 turns towards the interior of the housing and forms a thicker section in the area of the air supply means 53 in whch the slot-like channel portion 60 is formed and whose right boundary in FIG. 3 forms a wiping edge 73 interacting with the inside surface of the cylindrical portion 52′.

In order to form a fuel/air suspension, the perforated drum part 52 is driven via the flange 56, and specifically, clockwise in FIG. 3. The cylindrical portion 52′ then traverses the powdered-coal collecting chamber 58, causing the slots 57 to fill up due to the effect of gravity and the centrifugal force. The slots 57, filled with powdered coal, then arrive underneath the channel portion 60, where the powdered coal drops out of the slots due to the influence of the gravity and centrifugal force as well as the pressure of the suspension air flowing in the channel portion 60. The powdered coal is then suspended in the air flowing from the channel portion 60 to the lower channel portion 61. The formation of the suspension is then continued in the channel portion 62 with the participation of the air flowing-in from the ejector-like channels 63. Via the passageway 65 of the switch means 54 and channel 77 of the flange 55, the suspension thus formed then reaches the annular channel 25 of the connecting piece 40. After passing through the lower end of the annular channel 25 and the aperture of slider 27, the powdered coal arrives in the chambers 16 of the valve piston 4, while the suspension air escapes through the annular channel 28 and duct 31. It is essential that the powdered coal-and-air suspension is conducted from the channel portion 62 to the discharge from the slider 27 essentially in a straight line only and without constrictions of the cross-sectional area. For this reason, the annular channel 25 is constructed to have the same unobstructed cross-sectional area as the channel portion 62 and passageway 65, and the transition from the passageway 65 via the channel 77 to the annular channel 25 is gradual, the ribs 39 and 39' between tube 26 and connector 40 being formed so as to taper like blades.

Figure 4:
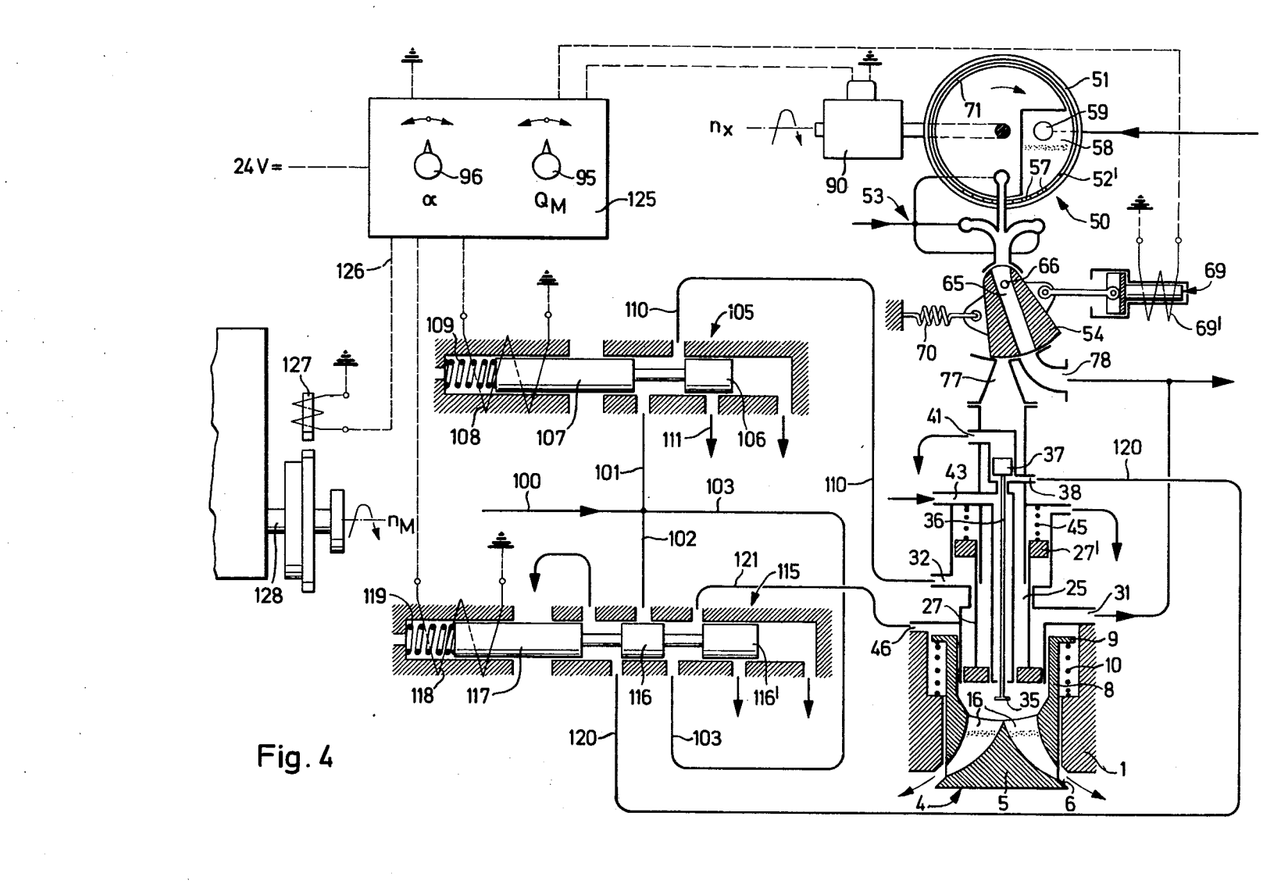
FIG. 4 illustrates a schematic of the engine according to the invention.
Figure 5A:
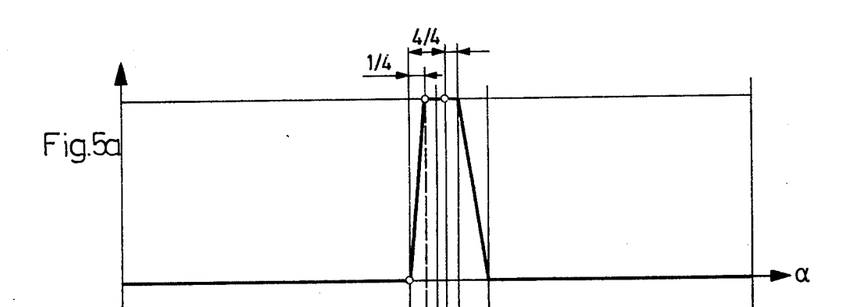
FIGS. 5a to d graphically illustrate various controls in accordance with the invention.
Figure 5B:
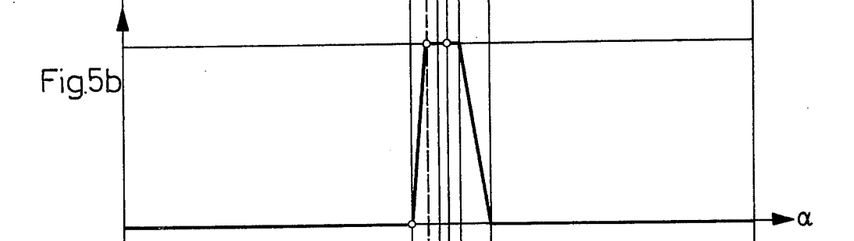
Figure 5C:
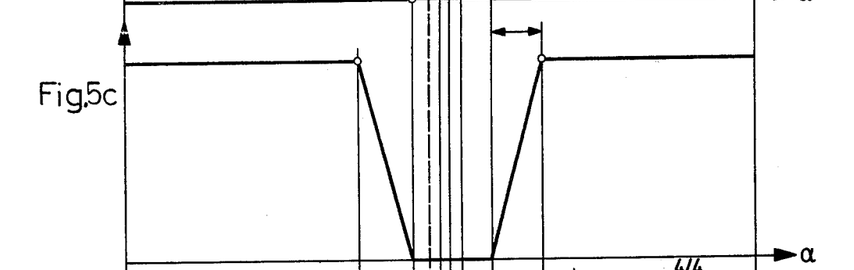
Figure 5D:
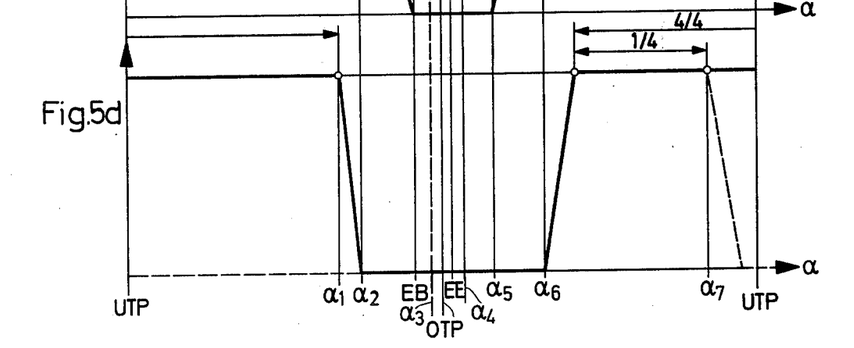

Referring to FIG. 4, wherein the parts shown in FIGS. 1a to 3 are shown schematically simplified, a hydraulic means is provided to actuate the various components. As shown, the pressure medium acting upon the various parts, which may for instance be a hydraulic fluid such as Diesel oil is supplied by a pump (not shown) via a line 100 which branches into three lines 101, 102 and 103. Line 101 leads to a hydraulic control slide valve 105 having a slider piston 106 which is actuated electromagnetically via an armature 107 which is joined to the piston 106 and enveloped in a coil 108 and which is biased by a spring 109. A line 110 leads from the housing of the control slide valve 105 to the duct 32 which ends under the piston 27' of the slider 27. In the shown position of the slider piston 106, pressure medium is conducted from the line 101 through the line 110 to the duct 32 so that the underside of the piston 27' is acted upon the lower end of the hollow slider 27 is in the closed position within the cylindrical wall 29.

Lines 102 and 103 lead to a similar hydraulic slide valve 115 having slider pistons 116 and 116' actuated via an armature 117 located within a coil 118 and biased by a spring 119. A line 120 leads to the bore 38 in the connecting piece 40 for the air valve 35. A line 121 leads to the bore 46 in the insert 30.

The two coils 108 and 118 are connected to an electrical control unit 125 to which a coil 69' of the electromagnet 69 which actuates the switch means 54 and an electric motor 90 which drives the perforated drum 52 are also connected. In addition, the control unit 125 is connected via a signal line 126 to an electromagnetic pickup 127 which senses the phase or the crank angle $\alpha$ of the engine crankshaft 128. The control slide valves 105 and 115 as well as the electromagnet 69 are thus controlled in a known manner as a function of the phase of the crank shaft 128. Moreover, an adjusting member 95 on the control unit 125 allows an adjustment of the speed of the electric motor 90 and/or the time during which the switch means 54 is in the filling position. This allows the amount of powdered coal reaching the valve piston 4 to be varied. Another adjusting member 96 of the control unit 125 allows the time during which pressure medium acts upon the piston 27' and the piston 9 as well as the servo piston 37 to be adjusted so that the time (EB in FIG. 5) can be varied when the blowing of fuel into the combustion chamber of the working cylinder starts.

The control diagram per FIGS. 5a to d show the following sequence of motions. According to FIG. 5a, the valve piston 4 is in closed position at the bottom dead center UTP of the working piston 2 of the internal-combustion engine operating in the two-cycle mode. The valve 35 controlling the injection air is also closed according to FIG. 5b, whereas the hollow slide valve 27 is in an open position according to FIG. 5c and the switch means 54 is in the filling position according to FIG. 5d. At time $\alpha_1$, the electromagnet 69 controlling the switch means 54 receives a signal from the control unit 125 in the sense that the switch means is swung from the filling position shown in FIG. 3 into the position shown in FIG. 4, in which the passageway 65 is in communication with the return channel 78. Therefore, at time $\alpha_2$, the supply of powdered coal to the valve piston 4 is interrupted and the hollow slider 27 starts a closing motion, as the coil 108 of the control slide valve 105 attracts the armature 107, releasing the flow of pressure medium from line 101 through line 110 to the underside of the piston 27'. The closing motion of the slider 27 is concluded at time EB, and the opening motions of the valve piston 4 and of valve 35 controlling the injection air start synchronously so that the injection of powdered coal also commences. The opening motions of valve piston 4 and air valve 35 come about when the coil 118 of the control slider 115 attracts the armature 117 and the slider piston 116 releases the flow of pressure medium from line 103 through line 121 to the top side of piston 9 of the valve piston 4 while the supply of pressure medium from line 102 is simultaneously interrupted by the piston 116. The opening motions are concluded at time $\alpha_3$, and for 4/4 load, the injection of fuel stops at the time EE. The valve piston 4 and the air valve 35 remain open up to time $\alpha_4$ to make certain that the seating surfaces of the valve piston 4 are blown clean.

The synchronous closing motions of the valve piston 4 and the air valve 35 then start at time $\alpha_4$, the coil 118 of the control slider 115 being deenergized and the pistons 116 and 116' moved to the right in FIG. 4 by the force of spring 119, thereby releasing the flow of pressure medium from line 102 through line 120 to the underside of the servo piston 37 while interrupting the flow of pressure medium from line 103. The closing motions of valve piston 4 and air valve 35 are concluded at time $\alpha_5$, and the opening motion of the hollow slider 27 starts when the coil 108 of the control slider 105 is deenergized and piston 106 is moved to the right in FIG. 4 by the force of spring 109 so that the supply from line 101 is interrupted and line 110 is connected with a drain line 111. Thus, the spring 45 pushes the hollow slider 27 into the open position shown in FIG. 1a. This position is reached at time $\alpha_6$. The gas trapped in the tubular shaft 7 of the valve piston 4 between the seating surface 6 and the sealing surfaces of the hollow slider 27 against the tube 26 and the cylinder wall 29 expands during the time span from $\alpha_5$ to $\alpha_6$.

After the hollow slider 27 has regained the open position, the switch means 54 begins a return motion into the filling position as the electromagnet 69 is deenergized and the spring 70 acting upon the switch means 54 becomes effective. For a 4/4 load of the engine, the switch means remains in the filling position up to time $a_1$. If the engine operates at a lesser load, the switch means 54 is shifted out of the filling position correspondingly sooner, such as at time $a_7$ for ¼ load.

The ignition means for the powdered coal introduced into the combustion chamber are not shown and are of the conventional type, such as in the form of a spark plug, or the injection of a small amount of oil or the like.

The described construction of the drum 52 resembling a perforated drum with the extremely large number of slots distributed in circumferential direction, the complete filling of which with powdered coal is aided by the centrifugal acceleration on the entry side, ensures in combination with the wiping effect of the edge 73, a quasi-continuous stream of powdered coal of precisely defined volume per unit of time, due to the constant speed of the drum 52. The described construction of the switch means 54, when in the filling position, allows this continuous stream of powdered coal to pass to the valve piston 4 completely unhindered. The total flow cross-section area remains constant at all times durng the shifting of the switch means because a constriction of the entry section of channel 77 is counteracted by an equal-sized enlargement of the entry section of channel 78.

What is claimed is:

1. In a reciprocating internal combustion engine having a combustion chamber for the combustion of finely divided solid fuel, the combination comprising
    means for forming a suspension of solid fuel particles and air,
    a valve piston for cyclically expelling solid fuel particles into said combustion chamber of the engine from a powdered coal collector disposed in said valve piston and adjacent said combustion chamber;
    a channel extending between said means and said collector along a straight vertical longitudinal axis to deliver the fuel/air suspension to said collector;
    a tube within a central and lower region of said channel to form said channel into an annular shape thereat; and
    an air valve disposed in said channel above said collector and coaxially within said tube for cyclically charging air into said collector to expel the fuel particles in said collector into said combustion chamber through said valve piston, said air valve having a seating surface sealingly seating on a lower end of said tube.

2. The combination as set forth in claim 1 which further comprises an axially movable hollow slider disposed about said lower region of said channel to move between an uppermost position and a lowermost position, said slider having a lower end for sealing said channel when in said uppermost position.

3. The combination as set forth in claim 2 which further comprises a housing insert defining a second annular channel about said slider, said slider having a seat for sealing said second annular channel when in said uppermost position.

4. The combination as set forth in claim 1 wherein said collector forms a plurality of chambers located on a side of said valve piston opposite said combustion chamber.

5. The combination as set forth in claim 4 which further comprises a tube within a central and lower region of said channel to form said channel into an annular shape thereat, an axially movable hollow slider disposed about said lower region of said channel to move between an uppermost position and a lowermost position, said slider having a lower end for sealing said channel when in said uppermost position, a housing insert defining a second annular channel about said slider, said slider having a seat for sealing said second annular channel when in said uppermost position, and wherein said valve piston includes a tubular shaft axially mounted about the lower ends of said slider and said channels.

6. The combination as set forth in claim 1 which further comprises an axially movable hollow slider disposed about said lower region of said channel to move between an uppermost position and a lowermost position, said slider having a lower end for sealing said channel when in said uppermost position, and a hydraulic means for moving said valve piston, said air valve and said slider.

7. The combination as set forth in claim 6 wherein said hydraulic means actuates opening of said valve piston and closing of said air valve.

8. The combination as set forth in claim 6 wherein said hydraulic means includes a common slider for controlling a supply of hydraulic fluid to said valve piston and said air valve.

9. The combination as set forth in claim 1 wherein said means includes a hollow drum rotatably disposed about a horizontal axis above said channel and having a plurality of slots in the periphery, a powdered coal reservoir located within said drum to dispense powdered coal into at least some of said slots, and an air supply means located in the area of the lowest point of said drum and having a downwardly directed air discharge channel communicating with said vertically disposed channel.

10. The combination as set forth in claim 9 wherein said air supply means further includes a pair of ejector-like channels disposed symmetrically of said air discharge channel below said drum.

11. The combination as set forth in claim 9 wherein said drum periphery passes through said air discharge channel and each said slot is of a circumferential width equal to the width of said air discharge channel.

12. The combination as set forth in claim 9 wherein said slots are rectangular.

13. The combination as set forth in claim 9 wherein said periphery of said drum is guided through said air discharge channel in tight manner for the discharge of powdered coal from said slots located within said air discharge channel.

14. The combination as set forth in claim 9 wherein said slots are arranged in a plurality of circumferential rows.

15. The combination as set forth in claim 14 wherein said rows are an even number.

16. The combination as set forth in claim 14 wherein adjacent rows of said slots are staggered relative to each other.

17. The combination as set forth in claim 14 wherein said rows number in excess of 100.

18. The combination as set forth in claim 9 which further comprises a switch means located between said air discharge channel and said vertical channel and having a passageway to selectively connect said channels to each other.

19. The combination as set forth in claim 18 wherein said switch means includes a means of cyclically moving said switch means to position said passageway between said channels for a variable time span.

20. The combination as set forth in claim 18 which further comprises a secondary channel adjacent said vertical channel and below said switch means, said passageway being movable between a first position aligned with said vertical channel and a second position aligned with said secondary channel, said channels being spaced apart a distance to retain a constant flow-cross-sectional area between said passageway and said channels.

21. In a reciprocating internal combustion engine having a combustion chamber for the combustion of finely divided solid fuel, the combination comprising means for forming a suspension of solid fuel particles and air, a valve piston for cyclically expelling solid fuel particles into said combustion chamber of the engine from a powdered coal collector disposed in said valve piston and adjacent said combustion chamber, said collector forming a plurality of chambers located on a side of said valve piston opposite said combustion chamber;

a channel extending between said means and said collector along a straight vertical longitudinal axis to deliver the fuel/air suspension to said collector;

an air valve disposed in said channel above said collector for cyclically charging air into said collector to expel the fuel particles in said collector into said combustion chamber through said valve piston;

a tube within a central and lower region of said channel to form said channel into an annular shape thereat;

an axially movable hollow slider disposed about said lower region of said channel to move between an uppermost position and a lowermost position, said slider having a lower end for sealing said channel when in said uppermost position;

a housing insert defining a second annular channel about said slider, said slider having a seat for sealing said second annular channel when in said uppermost position; and said valve piston including a tubular shaft axially mounted about the lower ends of said slider and said channels.

22. In a reciprocating internal combustion engine having a combustion chamber for the combustion of finely divided solid fuel, the combination comprising a valve piston for cyclically expelling solid fuel particles into said combustion chamber of the engine from a powdered coal collector disposed in said valve piston and adjacent said combustion chamber;

a channel extending from said collector along a straight vertical longitudinal axis to deliver a fuel/air suspension to said collector;

an air valve disposed in said channel above said collector for cyclically charging air into said collector to expel the fuel particles in said collector into said combustion chamber through said valve piston; and means for forming a suspension of solid fuel particles and air, said means including a hollow drum rotatably disposed about a horizontal axis above said channel and having a plurality of slots in the periphery thereof, a powdered coal reservoir located within said drum to dispense powdered coal into at least some of said slots, and an air supply means located in the area of the lowest point of said drum and having an air discharge channel communicating with said vertically disposed channel, said air supply means including a pair of ejector-like channels disposed symmetrically of said air discharge channel below said drum.

23. In a reciprocating internal combustion engine having a combustion chamber for the combustion of finely divided solid fuel, the combination comprising means for forming a suspension of solid fuel particles and air, a valve piston for cyclically expelling solid fuel particles into said combustion chamber of the engine from a powdered coal collector disposed in said valve piston and adjacent said combustion chamber;

a channel extending between said means and said collector along a straight vertical longitudinal axis to deliver a fuel/air suspension to said collector;

an air valve disposed in said channel above said collector for cyclically charging air into said collector to expel the fuel particles in said collector into said combustion chamber through said valve piston;

an axially movable hollow slider disposed about said lower region of said channel to move between an uppermost position and a lowermost position, said slider having a lower end for sealing said channel when in said uppermost position; and a hydraulic means for moving said valve piston, said air valve and said slider.

24. In a reciprocating internal combustion engine having a combustion chamber for the combustion of finely divided solid fuel, the combination comprising a valve piston for cyclically expelling solid fuel particles into said combustion chamber of the engine from a powdered coal collector disposed in said valve piston and adjacent said combustion chamber;

a channel extending from said collector along a straight vertical longitudinal axis to deliver a fuel/air suspension to said collector;

an air valve disposed in said channel above said collector for cyclically charging air into said collector to expel the fuel particles in said collector into said combustion chamber through said valve piston; and means for forming a suspension of solid fuel particles and air, said means including a hollow drum rotatably disposed about a horizontal axis above said channel and having a plurality of slots in the periphery, a powdered coal reservoir located within said drum to dispense powdered coal into at least some of said slots, and an air supply means located in the area of the lowest point of said drum and having a downwardly directed air discharge channel communicating with said vertically disposed channel.

* * * * *

UNITED STATES PATENT AND TRADEMARK OFFICE
CERTIFICATE OF CORRECTION

PATENT NO. : 4,070,996

DATED : January 31, 1978

INVENTOR(S) : Anton Steiger

It is certified that error appears in the above-identified patent and that said Letters Patent are hereby corrected as shown below:

```
Column 1, line 19, change "in" to --to--;
Column 2, line 65, after "head" insert --1--;
Column 3, line 46, change "uner" to --under--;
Column 4, line 10, change "5" to --51--;
Column 4, line 57, change "whch" to --which--;
Column 5, line 44, after "upon" insert --and--.
```

Signed and Sealed this

Twenty-seventh Day of June 1978

[SEAL]

Attest:

RUTH C. MASON
*Attesting Officer*

DONALD W. BANNER
*Commissioner of Patents and Trademarks*